United States Patent Office 3,438,917
Patented Apr. 15, 1969

3,438,917
FRICTION ELEMENT COMPRISING A PHENOL ISOBUTYRALDEHYDE CONDENSATE
Frank S. Grazen, Frank M. Bryzinsky, and Broni Kozma, North Tonawanda, N.Y., assignors to Hooker Chemical Corporation, Niagara Falls, N.Y., a corporation of New York
No Drawing. Continuation-in-part of application Ser. No. 364,018, Apr. 30, 1964. This application Nov. 29, 1967, Ser. No. 686,699
Int. Cl. C08g *37/06;* C09k *3/14;* F16d *69/02*
U.S. Cl. 260—19                                    12 Claims

ABSTRACT OF THE DISCLOSURE

A binder for a friction element composition comprised of asbestos fibre, friction imparting material, and a thermosettable phenol-aldehyde pre-condensate is provided by reaction of a phenol with isobutyraldehyde followed by a reaction with formaldehyde wherein the mole ratio of total aldehyde to phenol is between about 0.5 and about 1.0 and the total aldehyde comprises between about 5 and about 100 parts isobutyraldehyde and between about zero and about 95 parts formaldehyde. Then phenol may be phenol itself ($C_6H_5OH$), an alkyl substituted phenol, a terpene modified phenol, or mixtures thereof. The phenol aldehyde pre-condensate material may similarly be subsequently modified with a terpene or a vegetable derived oil, or both. The pre-condensate binder is dissolved in a hydrocarbon solvent and reacted with hexamethylenetetramine to become thermoset after the application of heat.

---

This is a continuation-in-part of Ser. No. 364,018 filed Apr. 30, 1964 now abandoned.

This invention relates to the use of a resinous material as a binder for friction elements and more particularly to those elements which are suitable for use in brakes of automotive vehicles, clutch facing, machine brakes, and many other industrial applications.

Friction elements are usually comprised of asbestos fibre, friction imparting materials, i.e. abrasives, filler materials, and binders. The fibre, fillers, abrasives, and binders are usually blended into a homogenous mixture, formed to a suitable shape and then cured under heat and pressure. Among materials used, either alone or in combination, as binder agents have been natural, synthetic, and reclaimed rubber hydrocarbons, natural resins, rosin and synthetic resins of all descriptions. Very often the resulting friction elements were unsatisfactory because they lacked sufficient physical strength or because in the course of curing the element or during its use objectionable warpage and shrinkage would occur.

To be satisfactory at operating temperatures of the brake, the binder should be stable, have toughness so as to avoid glazing the friction element and be of low cost. Still, it should possess sufficient flexibility to permit installation of the friction element, while not distorting during operation of the brake.

There has now been discovered a novel composition of phenolaldehyde pre-condensate binder which possesses desirable flexibility and provides more thorough wetting out of the friction element filler and abrasive, while retaining the other desirable characteristics of this class of materials. The term "wetting out" refers to the ability of the binder to flow to and adhere to the other components of the friction element.

It is an object of this invention to provide a friction element having an improved binding agent. Another object is to provide methods for making the improved friction element binder. Other objects will be apparent to those skilled in the art, upon reference of the following detailed description and examples.

In accordance with this invention, there is provided a friction element composition comprised of asbestos fibre, friction imparting material (i.e., abrasives) and an improved thermosettable phenolaldehyde pre-condensate binder of the formula:

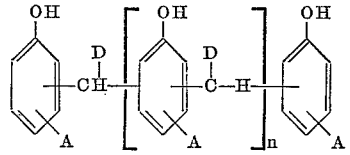

wherein each D substituent is independently selected from the group consisting of hydrogen and isopropyl and at least one D substituent is isopropyl, each A substituent is independently selected from the group consisting of alkyl, alkylaryl, cycloalkyl, and hydrogen, and $n$ is a number from 1 to 18.

The improved phenol-aldehyde pre-condensate binder of this invention is prepared by reacting at a temperature of between about 25 and about 150 degrees centigrade and a pressure of between about zero and about 100 pounds per square inch gauge (p.s.i.g.) a phenol with isobutyraldehyde to form a phenol-isobutyraldehyde pre-condensate, followed by reacting the said phenol-isobutyraldehyde pre-condensate with formaldehyde to form the thermosettable phenol-aldehyde precondensate binder of isobutyraldehyde and formaldehyde with a phenol. In the above formula, the CHD group represents the aldehyde residue after the linking of the two phenol molecules. Thus, the D substituent would be isopropyl when the aldehyde consumed was isobutyraldehyde and the D substituent would be hydrogen when the aldehyde consumed was formaldehyde.

The modified phenol-aldehyde pre-condensate which is preferred in the practice of this invention will have from 5 to 100 mole percent of the aldehyde component in the form of isobutyraldehyde, preferably between 5 and 50 mole percent will be used. The remaining mole percent of aldehyde used for the pre-condensate binders of this invention is formaldehyde, which may be employed in aqueous solution (formalin) or in any of its low polymeric forms such as paraformaldehyde or trioxane.

The mole concentration of isobutyraldehyde employed to make the improved binder may be determined by the rate at which the pre-condensate binder cures and the amount of isobutyraldehyde required to achieve the desired physical properties of the friction element. High concentrations of isobutyraldehyde in the phenolic-aldehyde pre-condensate binder mixture will resinify; however, the reaction is sluggish and the resulting binders are slow curing. Low concentrations of isobutyraldehyde are insufficient to produce noticeable changes in the physical properties of the friction element.

Varying the percentage of isobutyraldehyde used with respect to the total amount of aldehyde consumed changes the viscosity of the resulting varnish made from the pre-condensate of this invention. The higher the percentage of isobutyraldehyde content, the higher the viscosity of the pre-condensate varnish binder will be. Also, the use of isobutyraldehyde allows the resin binder to be increased in viscosity more than the corresponding amount of formaldehyde would permit before gelation of the resin binder would occur. To achieve the same viscosity using only formaldehyde would require the use of additional anti-gelling agents such as organic amines like triethanolamine and aniline.

Examples of phenols which may be used in preparing the phenolaldehyde pre-condensate for use in practicing the invention include phenol itself ($C_6H_5OH$) and substituted phenols having the general formula

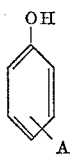

where A may be a suitable substitutent selected from the following (a) Alkyl groups or radicals of 1 to 12 carbon atoms and their various isomeric forms and substituted on the phenolic nucleus in the ortho-, meta-, or para- position;

(b) Cycloalkyl groups of 5 to 12 carbon atoms such as cyclohexyl, cyclopentyl, methylcyclohexyl, butylcyclohexyl, and so forth;

(c) Alkyl ad cycloalkyl ketonic groups wherein the hydrocarbon portion is as defined in (a) and (b);

(d) Alkyl and cycloalkyl carboxylic groups wherein the hydrocarbon part is defined as above in (a) and (b);

(e) Aryl substituted alkyl wherein the aryl is phenyl which may contain lower alkyl and/or hydroxy substituents so that the resulting phenol is, for example, a bisphenol and (f) Mixtures of the aforesaid phenols.

Suitable substituted phenols include the following: para-tert-butyl-phenol, sec-butyl-phenol, para-tert-amylphenol, para-tert-hexylphenol, para-isooctyl-phenol, para-tert-octyl-phenol, para-cyclohexyl-phenol, para-decyl-phenol, para-dodecyl-phenol, para-tert-decyl-phenol, para-nonyl-phenol, para-methyl-phenol, bisphenols such as para, para'-isopropylidene-diphenol, para, para-methylene-diphenol, as well as the corresponding ortho- and meta- derivatives of the previously mentioned compounds such as meta-butyl-phenol and ortho-butyl-phenol as well as mixtures thereof.

Mixtures of various phenols mentioned herein also may be used.

From the foregoing, it is apparent that many phenols may be used in practicing the present invention provided the phenol has the reactive phenolic hydroxyl group and is capable of reacting with isobutyraldehyde and formaldehyde to produce a condensate. Pure, refined phenols may be used, but this is not necessary. For instance, phenols may be alkylated and then may be reacted in crude form with an aldehyde. In such crude form, the phenols may contain some polyalkylated, as well as non-alkylated phenols. The alkylation process for alkylation of a phenol is well known in the art. First dehydration (of water) is carried out with vacuum and elevated temperature, for instance between about 100 and about 150 degrees centigrade under a vacuum of between about 20 and about 30 inches of mercury. Then, the dehydrated phenolic material is acidified to a pH of between about one and about five with $H_2SO_4$ or in some cases $BF_3$. Following this the terpene or vegetable oil is added and the reaction mixture heated to between about 80 and about 140 degrees centigrade at atmospheric pressure. The mole ratio of reactants is between about 0.1 mole of terpene or vegetable oil per mole of phenol to about 2.5 mole of terpene or vegetable oil per mole of phenol. When tung oil is employed as a vegetable oil in the alkylation, use of $BF_3$ to acidify would cause gelation; so it is not used, but $H_2SO_4$ can be used.

The proportion of aldehyde to be condensed with the phenol may be varied to prepare novolacs of different molecular weights and viscosity of the finished pre-condensate may be controlled by the mole weight of the novolac. Preferably, the proportion of aldehyde employed varies from about 0.5 to 1.0 moles per mole of phenol when the mono- or difunctional phenol is used. In instances where a trifunctional phenol is used, i.e. non-substituted in the ortho- and para- position, a preferred upper limit of the aldehyde may be about 0.85 mole of aldehyde per mole of phenol so as to minimize the formation of insoluble, infusible condensates. It is preferred that the aldehyde and phenol be condensed using an acid catalyst to shorten the time required for complete condensation of the reactants. Suitable acid catalysts include sulfuric acid, hydrochloric acid, and oxalic acid. These catalysts are generally employed in the amount from 0.1 to about 5 percent of the weight of phenol to be condensed.

The phenol-aldehyde pre-condensate is prepared by charging the desired phenol and aldehyde raw materials and catalysts to a reaction vessel. The reaction proceeds under temperatures from about 25 to about 150 degrees centigrade at a pressure from about ambient to about 100 pounds per square inch gauge pressure for a period of time from about 5 minutes to about 5 hours, a suitable time being about 1 and one-half hours, or until the desired degree of condensation has taken place. The phenol is first reacted with the isobutyraldehyde to form a phenol-isobutyraldehyde pre-condensate, followed by a second step reaction of the phenol-isobutyraldehyde pre-condensate with formaldehyde to form the thermosettable phenol-aldehyde pre-condensate binder. In the second step the reactants are refluxed at atmospheric pressure, although higher reflux temperatures up to about 150 degrees centigrade can be used by employing elevated pressure. The formaldehyde can be added all at once in the second step, or added gradually. If the formaldehyde is added all at once, then a temperature range between about 50 and about 60 degrees centigrade is used at the beginning of the second step reaction, until the exothermic reaction subsides, and then the temperature is increased slowly to between about 70 and about 80 degrees centigrade and held until further exothermic reaction subsides, and then the reaction mixture is heated to reflux temperature which is about 100 degrees centigrade at atmospheric pressure. If elevated pressure is used, then the reflux temperature can be increased to as high as about 140 degrees centigrade. If the formaldehyde is added gradually in the second step then a temperature range between about 95 and about 140 degrees centigrade can be used. The catalyst is then neutralized and the excess reactant, water and other materials, are taken off.

While the pre-condensate is still hot, from about 25 degrees to about 150 degrees, 100 degrees centigrade being very suitable, it is reduced in viscosity by the addition of a suitable solvent. The amount of solvent may vary from about 10 to 70 percent of the precondensate by weight and a suitable ratio of pre-condensate to solvent is about 10 parts of pre-condensate to 9 parts of solvent. The controlling factor is the resulting viscosity of the pre-condensate varnish prepared, rather than the actual volume of solvent charged. After cooling the pre-condensate varnish to prevent loss of solvent, the varnish is discharged from the reaction kettle. This varnish is soluble in hydrocarbon solvents such as aliphatics like alcohols, ketones, and aromatics like xylene, toluene, and benzene, although most of the more common alcohols and ketones are less desirable due to their high evaporation rate and storage stability factors.

The incorporation of alcohols such as methanol, or ethanol, to modify viscosity and drying rate of the pre-condensate varnish is most advantageously effected during the final blending operation. Mixing is continued until the pre-condensate varnish is uniform. At this point, the desired amount of methylene link donor materials such as hexamethylene-tetramine may be admixed, otherwise it is added to the dry friction element mix. From 2 to 12 percent based on the weight of pre-condensate is a satisfactory amount of donor material.

The varnish is now suitable for use as a friction composition constituent and as a binder for brake lining fillers. A typical friction element contains from 30 to 60 percent asbestos fibre, up to 40 percent inorganic filler and abrasives, up to 15 percent organic filler and 20 to 30 percent binder, all percents are by weight of total composition. Asbestos fibre, abrasive materials and filler materials are charged into a mixer, followed by the addition of the varnish binder. The ingredients are kneaded until the fibre, abrasives, and any fillers are thoroughly wetted and a uniform mass is obtained. The mass is discharged from the mixer, rolled out into sheets or extruded and dried, after which it is ready for further processing into friction elements.

The abrasives (friction imparting agents) and fillers employed within the scope of this invention include, but are not limited to, brass chips, metal shavings and filings, silica, talc, wood flour, chalk, clay, mica, fiberglass, felt, carbon black, graphite, metal nitrides and oxides, and ground cashew nut shell oil polymerizate. These abrasives and fillers may be used alone or in combination to achieve the particular amount of bulk and coefficient of friction desired. The above listed materials have a particle size such that they will pass through a U.S. Standard Sieve (1940) Number 3 which has a sieve opening of 6.3 millimeters. Preferably, the particle size of these materials will range from passing through a Number 4 sieve, sieve opening size 4.76 millimeters, and yet be retained on a Number 80 sieve, sieve opening size 0.177 millimeter.

The pre-condensate binders of this invention may be modified by either alkylating the pre-condensate or by oil modifying or by both procedures. Alkylation of the resin with a terpenic type material, $C_{10}H_{16}$, such as d-limonene or dipentene will improve the pre-condensate compatibility with oil. Such alkylation reduces the number of available reactive positions of the phenol nuclei for the final methylene linking. Oil modification increases the drying rate of the pre-condensate varnish and improves adhesion to the surfaces.

Alkylation is conveniently accomplished by charging the alkylating material to the reaction vessel containing the phenol-aldehyde pre-condensate just after the dehydration step has been completed. The final conditions of heat and pH of the dehydration step are suitable. Alkylation is best achieved by reacting from 0.2 to 1.0 mole, preferably from 0.3 to 0.7 mole of d-limonene with each mole of phenol in the precondensate. The additional alkylation of the resin with this terpenic type material ($C_{10}H_{16}$) improves the compatibility of the resin with drying oils.

A second possible modification of the pre-condensate of this invention is oil modifying. If the pre-condensate is to be modified by both alkylation and oil, the oil modification follows the alkylation step. The pre-condensate may be oil modified by heating and reacting the pre-condensate with one of the oils belonging to the class of vegetable-derived oils commonly known in the resin and varnish industries as drying oils, such as tung, soya, linseed, dehydrated castor, oiticia, and tall oils. Drying oils preferred in this invention are linseed oil and dehydrated castor oil. The preferred oils may be used in the ratio from 90 to 10 parts by weight and preferably from 40 to 10 parts by weight when the total amount of oil and pre-condensate equals 100 parts. The oil is heated to about 100 degrees centigrade and the pre-condensate is charged, after which the temperature is increased to nearly 300 degrees centigrade and held for a length of time until all the pre-condensate has reacted with the oils. Based upon changes in the specific refraction and viscosities, there is some evidence of a chemical reaction between the pre-condensate and the drying oil, particularly if the drying oil has a conjugated system of double bonds. The exact nature of the chemical reaction is not yet known.

It is to be understood that the foregoing steps of alkylation and oil modification are given only to more fully illustrate variations of the invented pre-condensates.

The practice of this invention is illustrated by the following examples, in which parts are by weight and temperatures are in degrees centigrade unless otherwise noted.

EXAMPLE 1

To a reaction vessel or pot was charged 100 parts of phenol and 0.5 part of concentrated sulfuric acid. The charge was mixed and heated to 95 degrees centigrade. Slowly, 18 parts of isobutyraldehyde were added and held at 110 degrees centigrade or lower until all of the isobutyr-aldehyde had reacted. Then, 20 parts of a 37 percent formaldehyde water solution were slowly added and the reaction mixture was refluxed until all the formaldehyde had reacted. The pre-condensate (novolac) was vacuum treated (30 inches of mercury and at 105 degrees) to remove water. Additional phenol and concentrated sulfuric acid were added to replace that which was removed during the vacuum treatment. Thereafter, 55 parts of d-limonene were added subsurface at 120 to 130 degrees centigrade over a period of one-half hour, refluxing continuing. The temperature was increased to 185 degrees centigrade and the pre-condensate was further vacuum treated until the pre-condensate had a melting range of 70 to 80 degrees centigrade. Charged into another reaction vessel were 105.5 parts of alkali refined linseed oil and 160 parts of dehydrated castor oil of Gardner viscosity Z-2 to Z-3. The oil was mixed and heated to 100 degrees after which 147.5 parts of the previously described pre-condensate were added. The temperature was raised to 280 degrees and held there until a pre-condensate toluene solution (45 percent toluene) had a Gardner viscosity of G to H. The resulting product was cooled to 160 to 170 degrees before discharging it to suitable containers. The oil modified pre-condensate was made into a varnish by heating 100 parts of pre-condensate to 100 to 110 degrees centigrade and slowly adding with stirring 27.7 parts of toluene. This varnish was cooled to 75 degrees centigrade and slowly, with stirring, 9.5 parts of ethyl alcohol were added. This varnish mixture was agitated until uniform. The varnish was then suitable for use as a binder for the brake lining component and fillers.

Additional resins of this invention were prepared by the procedure of Example 1. The composition and properties of some of these resins are summarized in the table below.

TABLE

| Example | 2 | 3 | 4 | 5 [1] |
|---|---|---|---|---|
| Composition (by weight): | | | | |
| Phenol | 2,000 | 2,000 | | 2,040 |
| Para-tert-octyl-phenol | | | 2,840 | |
| Sulfuric acid (catalyst) | 24 | 24 | 28 | 20 |
| Isobutyraldehyde | 360 | 72 | 144 | 144 |
| Formaldehyde (37% solution) | 400 | 720 | 640 | 640 |
| d-Limonene | 1,100 | 1,100 | | 1,100 |
| Linseed oil | 2,110 | 2,110 | | |
| Soybean oil | 3,200 | 3,200 | | 3,200 |
| Castor oil | | | | 2,110 |
| Physical Properties: | | | | |
| (1) Pre-condensate: | | | | |
| Melting range, degrees centigrade | 54-65 | 52-60 | 42-50 | 52-61 |
| pH (1:4 resin:water mixture) | 4.6 | 7.6 | 3.7 | 3.6 |
| (2) Oil modified pre-condensate: | | | | |
| Viscosity, centipoises at 20 degrees centigrade | 3,250 | 2,600 | | 4,250 |
| Total solids, percent | 69.3 | 69.8 | | 68.6 |

[1] Phenol and d-limonene were first reacted together.

EXAMPLE 6

The pre-condensate varnish of Example 1 was used to prepare friction elements for automotive vehicles. The friction element contained 500 parts of dry mix, 12 parts hexamethylenetetramine, 143 parts of the pre-condensate varnish of Example 1, and 27 parts of toluene. The dry mix is composed of 90 parts by weight of asbestos shorts, Quebec Standard Asbestos Grade 7K, and 10 parts by weight of friction particles which is completely polymerized cashew nut shell oil. The moisture content of the dry mix is held low between 0.75 and 1.0 percent to avoid any possibility of blistering of the element during cure.

To an internal mixer equipped with a Sigma-type blade was charged the dry mix and hexamethylenetetramine. The dry materials were mixed and blended for five minutes. Then the pre-condensate varnish and toluene were added and mixed for 1 hour until the mass was uniform. The dough-like mix was then discharged from the mixer and charged to an extruder. The extruder is equipped with a 2 inch by ¼ inch rectangular die and has an applied ram pressure of 100 to 300 pounds per square inch. The dough-like mix was then extruded in a shape which was satisfactory for brake linings. The extruded linings were oven dried for 3 hours with a gradual increase of temperatures up to about 88 degrees centigrade to remove solvents and other volatiles. The linings were then cut to proper length, reheated for 2 to 3 minutes at about 163 degrees centigrade, bent or arced to the desired curvature and placed into formers for curing. These linings were then cured for 8 hours at about 205 degrees centigrade. The cured linings, after cooling were sanded to the proper size for mounting onto brake shoes. The resulting friction elements were satisfactory for use on automotive brakes.

EXAMPLE 7

The pre-condensate varnish of Example 4 was used to prepare friction elements for automotive vehicles. The friction element contained 500 parts of dry mix, 12 parts hexamethylenetetramine, 143 parts of the pre-condensate varnish of Example 1, and 27 parts of toluene. The dry mix is composed of 90 parts by weight of asbestos shorts, Quebec Standard Asbestos Grade 7K, and 10 parts by weight of friction particles which is completely polymerized cashew nut shell oil. The moisture content of the dry mix is held low between 0.75 and 1.0 percent to avoid any possibility of blistering of the element during cure. This friction element can then be reacted with hexamethylenetetramine in the presence of the dry mix and toluene in accordance with Example 6, and extruded to form brake linings.

EXAMPLE 8

The pre-condensate varnish of Example 2 was used to prepare friction elements for automotive vehicles. The friction element contained 500 parts of dry mix, 6 parts hexamethylenetetramine, 143 parts of the pre-condensate varnish of Example 1, and 27 parts of toluene. The dry mix is composed of 90 parts by weight of asbestos shorts, Quebec Standard Asbestos Grade 7K, and 10 parts by weight of friction particles which is completely polymerized cashew nut shell oil. The moisture content of the dry mix is held low between 0.75 and 1.0 percent to avoid any possibility of blistering of the element during cure. This friction element can likewise then be treated in accordance with Example 6 and extruded to form brake linings.

Similar results are obtained with the other resins of this invention disclosed in the other specific examples.

Various changes and modifications may be made in the method, composition and articles of this invention. Certain preferred forms of which have been described and equivalents may be substituted without departing from the spirit and scope of this invention.

We claim:
1. A friction element composition comprised of asbestos fibre, friction imparting material, and an oil-modified thermosettable phenol-aldehyde pre-condensate binder prepared by reacting at a temperature of between about 25 and about 150 degrees centigrade and a pressure of between about zero and about 100 p.s.i.g., a phenol with isobutyraldehyde to form a phenol-isobutyraldehyde pre-condensate followed by reacting at a temperature between about 50 degrees centigrade and the reflux temperature, the phenol-isobutyraldehyde pre-condensate with formaldehyde to form the thermosettable phenol-aldehyde pre-condensate binder, the mole ratio of total aldehydes to phenol being between about 0.5 and about 1.0 and the total aldehydes comprising between about 5 and about 100 parts isobutyraldehyde and between about zero and about 95 parts formaldehyde, followed by oil modifying the thermosettable phenolaldehyde pre-condensate binder by reaction with a vegetable derived oil at a temperature between about 100 and about 300 degrees centigrade.

2. The composition of claim 1 wherein the total aldehydes comprise between about 5 to about 50 parts isobutyraldehyde and between about 50 and 95 parts formaldehyde.

3. A composition of claim 1 wherein the phenol is phenol.

4. The composition of claim 3 wherein the phenol is the product of alkylation of phenol with a terpene at a temperature between about 80 and about 140 degrees centigrade.

5. The composition of claim 3 wherein the said phenolaldehyde pre-condensate binder is modified by alkylation with a terpene by dehydration of the said phenolaldehyde pre-condensate binder under a vacuum of between 20 and 30 inches of mercury and at a temperature between about 100 and about 150 degrees centigrade, followed by acidification to a pH between about one and about 5, followed by addition of terpene in a mole ratio between about 0.1 and about 2.5 mole of terpene per mole of phenol, and the reaction mixture heated to between about 80 and about 140 degrees centigrade.

6. The reaction product of claim 5 wherein the alkylated precondensate binder is oil modified with a vegetable derived oil at a temperature between about 80 and about 140 degrees centigrade, wherein from about 10 to about 90 parts by weight of oil are used per 100 parts of the reaction product.

7. A composition of claim 1 wherein the thermosettable phenol aldehyde pre-condensate binder is oil modified with a vegetable derived oil wherein from about 10 to about 90 parts by weight of oil are used per 100 parts of the reaction product.

8. A composition of claim 1 wherein the phenol is para-tertiary octyl-phenol.

9. The composition of claim 1 wherein the phenol is para-tertiary butyl phenol.

10. A friction element wherein the binder is an oil-modified thermosettable phenol-aldehyde pre-condensate binder of claim 1 and hexamethylenetetramine.

11. A friction element wherein the binder is a polymeric product of claim 1 reacted with hexamethylenetetramine in the presence of a hydrocarbon solvent.

12. A friction element composition comprising:
(A) asbestos,
(B) up to 40 percent by weigh of an inorganic filler and abrasives,
(C) organic friction imparting material, and
(D) as a binder a phenolic resin prepared by reacting at a temperature of between about 25 and about 150 degrees centigrade and a pressure of between about zero and about 100 p.s.i.g., a phenol with isobutyraldehyde to form a phenol-isobutyraldehyde pre-condensate, followed by reacting the resultant product with formaldehyde to form the thermosettable phenol-aldehyde pre-condensate binder, the mole ratio of total aldehydes to phenol being between about 0.5 and 1.0 and the total aldehydes comprising between about 5 and about 100 parts isobutyraldehyde and between about zero and about 95 parts formaldehyde, followed by oil modifying the thermosettable phenol-aldehyde pre-condensate binder by reaction with a vegetable derived oil at a temperaure between about 100 and about 300 degrees centigrade.

References Cited

UNITED STATES PATENTS

| | | | |
|---|---|---|---|
| 1,477,870 | 12/1923 | Ellis | 260—56 |
| 2,176,951 | 10/1939 | Bannister | 260—53 |
| 2,231,860 | 2/1941 | Swallen | 260—53 |
| 2,373,058 | 4/1945 | Silherkraus | 260—51 |
| 2,534,607 | 12/1950 | Laher et al. | 260—29.2 |
| 2,954,853 | 10/1960 | Maierson et al. | 188—234 |
| 3,316,204 | 4/1967 | Lederer | 260—38 |
| 3,297,599 | 1/1967 | Eschen | 260—3 |

FOREIGN PATENTS

| | | |
|---|---|---|
| 644,447 | 10/1950 | Great Britain. |
| 3,711,428 | 8/1962 | Japan. |

DONALD E. CZAJA, *Primary Examiner.*

W. E. PARKER, *Assistant Examiner.*

U.S. Cl. X.R.

260—38, 46, 53, 55, 57